US007076664B2

(12) United States Patent
Murase et al.

(10) Patent No.: US 7,076,664 B2
(45) Date of Patent: Jul. 11, 2006

(54) USER CONFIRMATION SYSTEM AND METHOD

(75) Inventors: Kentaro Murase, Kawasaki (JP); Masaki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 745 days.

(21) Appl. No.: 09/808,004

(22) Filed: Mar. 15, 2001

(65) Prior Publication Data

US 2002/0046347 A1 Apr. 18, 2002

(30) Foreign Application Priority Data

Oct. 18, 2000 (JP) ............................ 2000-317731

(51) Int. Cl.
*H04K 1/00* (2006.01)
*H04L 9/00* (2006.01)
*G06K 9/00* (2006.01)

(52) U.S. Cl. .......................... 713/186; 726/2; 713/170

(58) Field of Classification Search ................ 713/182, 713/186, 185
See application file for complete search history.

(56) References Cited

U.S. PATENT DOCUMENTS 6,311,272 B1 * 10/2001 Gressel ........................ 713/186
6,370,263 B1 * 4/2002 Hiratsuka et al. ........... 382/115
6,484,260 B1 * 11/2002 Scott et al. ................. 713/186
6,564,323 B1 * 5/2003 Takahashi et al. .......... 713/182
6,775,775 B1 * 8/2004 Yoshiura et al. ............ 713/186
6,801,907 B1 * 10/2004 Zagami ......................... 707/3

FOREIGN PATENT DOCUMENTS

| | | |
|---|---|---|
| JP | 63-282579 | 11/1988 |
| JP | 02-096299 | 4/1990 |
| JP | 5-35935 | 2/1993 |
| JP | 5-233783 | 9/1993 |
| JP | 10-69463 | 3/1998 |
| JP | 10-154248 | 6/1998 |
| JP | 10-162088 | 6/1998 |
| JP | 10-283465 | 10/1998 |
| JP | 2000-132515 | 5/2000 |

OTHER PUBLICATIONS

Office Action for corresponding Japanese Application No. 2000-317731 mailed Dec. 13, 2005.

* cited by examiner

*Primary Examiner*—Kambiz Zand
(74) *Attorney, Agent, or Firm*—Staas & Halsey LLP

(57) ABSTRACT

A user confirmation system using a recording medium capable of storing information includes a biological information obtaining part for obtaining first biological information on a user at a time of first use of a recording medium, an owner registration part for registering the first biological information in the recording medium, considering the user as an owner of the recording medium, and an owner confirmation part for detecting second biological information on a user at a time of second and later use of the recording medium, and determining whether or not the user using the recording medium is identical with the owner registered in the recording medium, based on the first and second biological information.

10 Claims, 10 Drawing Sheets

USER CONFIRMATION SYSTEM AND METHOD

BACKGROUND OF THE INVENTION

1. Field of the Invention

The present invention relates to a user confirmation system and method for utilizing recording media as tickets or the like used by an indefinite number of many people, such as train tickets and admission tickets, thereby automatically confirming owners of the tickets or the like.

2. Description of the Related Art

Regarding a recording medium issued to a particular individual, intended for use for a long period of time, such as a credit card for managing information on credibility of an individual and an ID card for identifying an employee and managing arrival at and departure from an office, it is important to authenticate an owner of a recording medium.

Conventionally, an owner has been confirmed by letting a user input a previously registered personal identification number or visually confirmed by a third party at a time of use of a recording medium by taking a face picture of an owner and attaching it to an ID card at a time of issuance thereof.

Furthermore, JP 5 (1993)-233783 A and JP 5 (1993)-35935 A disclose a method for identifying a user with an owner by taking a face picture of a user at a time of use and applying a picture recognition technique. Furthermore, JP 10 (1998)-154248 A discloses, regarding a train ticket, a method for specifying a track section of unauthorized use, in which when unauthorized use is found based on data stored in a train ticket, face picture data captured at a time of entrance is matched with that at a time of exit.

However, according to the above-mentioned recording medium, it takes a considerable period of time to register owner identity information for identifying an owner. Therefore, such a recording medium is not effective for tickets issued in a large number to an indefinite number of many people, such as a train ticket used for utilizing a railroad and a pass for an expressway.

More specifically, regarding tickets issued in a large number to an indefinite number of many people, there is no time for registering owner identity information, and actual management is difficult, so that the above-mentioned recording medium cannot be used. Furthermore, at a time of use, it is required for a user to input a personal identification number, and for a third party to compare a picture with a user. This requires a long period of time and personal resources, which is not economical in actual management, and therefore, use of the above-mentioned recording medium cannot be realized.

The above-mentioned methods disclosed by JP 5 (1993)-233783 A and JP 5 (1993)-35935 A overcome the above-mentioned problems by automating processing. However, a face picture is taken at a time of issuance of an ID card; therefore, a recognition rate is decreased due to the difference in appearance and the like between the time of registration and the time of use caused by changes over time, resulting in increased misrecognition.

Furthermore, according to the method disclosed by JP 10 (1998)-154248 A, an owner of a train ticket is not confirmed. Therefore, it is impossible to prevent unauthorized use, such as use of one train pass by a plurality of people and unauthorized train-taking such as getting-on with an entrance ticket and getting-off with an entrance ticket of another station prepared by a cooperator.

SUMMARY OF THE INVENTION

Therefore, with the foregoing in mind, it is an object of the present invention to provide a user confirmation system and method capable of immediately registering owner identity information even in a recording medium such as a ticket issued in a large number to an indefinite number of many people, and exactly preventing unauthorized use thereof.

In order to achieve the above-mentioned object, the user confirmation system of the present invention using a recording medium capable of storing information includes: a biological information obtaining part for obtaining first biological information on a user at a time of first use of the recording medium; a user registration part for registering the first biological information in the recording medium, considering the user as an owner of the recording medium; and an owner confirmation part for detecting second biological information on a user at a time of second and later use of the recording medium, and determining whether or not the user using the recording medium is identical with the owner registered in the recording medium, based on the first and second biological information.

Because of the above-mentioned constitution, the biological information on a user is obtained at a time of use of the recording medium. Therefore, identification between an owner and a user can be rapidly confirmed, and unauthorized use, if any, can be found. Furthermore, natural suppression effects with respect to unauthorized use can be expected.

Furthermore, in the user confirmation system of the present invention, the owner registration part preferably includes: a biological information obtaining part for obtaining first biological information on a user at a time of first use of the recording medium; a recording medium reading part for reading information on a use status of the recording medium; a read data checking part for checking whether or not the recording medium is being used with proper authorization, based on the information on a use status read in the recording medium reading part; and a recording medium writing part for writing, in a case of use with proper authorization, the first biological information on the user and the information on a use status of the recording medium in the recording medium, and writing, in a case of use without proper authorization, invalidity information on the recording medium and the information on a use status in the recording medium.

Because of the above-mentioned constitution, information for determining whether the recording medium is being used with proper authorization or without proper authorization is stored in a bunch in the recording medium, whereby it can be checked whether or not unauthorized use is conducted on each scene using the recording medium.

Furthermore, in the user confirmation system of the present invention, the owner confirmation part preferably includes: a user biological information obtaining part for obtaining the second biological information on a user of the recording medium; a recording medium reading part for reading an identifier of the recording medium, information on a use state of the recording medium, and the first biological information on the user; a use status checking part for checking whether or not the recording medium is being used with proper authorization, based on the information on a use status read in the recording medium reading part; a similarity determining part for calculating similarity by comparing the second biological information obtained in the user biological information obtaining part with the first biological information read in the recording medium reading part, determining authorized use when the similarity exceeds a predetermined threshold value, and determining unauthorized use when the similarity is equal to or lower than a predetermined threshold value; and a recording medium writing part for writing, in a case of use with proper authorization, the information on a use status and, if required, the second biological information on the user in the recording medium, and writing, in a case of use without proper authorization, invalidity information on the recording medium and the information on a use status in the recording medium.

Because of the above-mentioned constitution, information for determining whether the recording medium is being used with proper authorization or without proper authorization is stored in a bunch in the recording medium, whereby it can be checked whether or not unauthorized use is conducted on each scene using the recording medium. Furthermore, the first biological information on an owner is updated, if required, every time the recording medium is used with proper authorization, so that misrecognition due to changes over time can be prevented.

Next, in order to achieve the above-mentioned object, the user confirmation system of the present invention using a recording medium capable of storing information includes: a biological information obtaining part for obtaining first biological information on a user at a time of first use of the recording medium; an owner registration part for registering the first biological information in a database disposed on a network, considering the user as an owner of the recording medium; and an owner confirmation part for detecting second biological information on a user at a time of second and later use of the recording medium, and determining weather or not a user using the recording medium is identical with the owner registered in the database, based on the first and second biological information.

Because of the above-mentioned constitution, the biological information on a user is obtained at a time of use of the recording medium. Therefore, identification between an owner and a user can be rapidly confirmed, and unauthorized use, if any, can be found. Furthermore, large-capacity data, such as biological information on users and owners, is stored on a network server, so that the use status of a user can be grasped merely by accessing the network server. This makes it possible to mange information as a single unit. Even in the case where a recording medium is damaged or lost, an owner's use status is obtained, and an exact fee can be collected by searching for use status data and/or biological information data on the network server.

Furthermore, in the user confirmation system of the present invention, the owner registration part includes: a biological information obtaining part for obtaining first biological information on a user at a time of first use of the recording medium; a recording medium reading part for reading an identifier of the recording medium; a read data checking part for checking whether or not the recording medium is being used with proper authorization, based on the information on a use state extracted from the database, using the identifier read in the recording medium reading part as key information; and a recording medium writing part for writing, in a case of use with proper authorization, the first biological information on the user and the information on a use status of the recording medium in the database and writing, in a case of use without proper authorization, invalidity information on the recording medium and the information on a use status in the database.

Because of the above-mentioned constitution, information for determining whether the recording medium is being used with proper authorization or without proper authorization is stored in a bunch in the recording medium, whereby it can be checked whether or not unauthorized use is conducted on each scene using the recording medium.

Furthermore, in the user confirmation system of the present invention, the owner confirmation part includes: a user biological information obtaining part for obtaining the second biological information on a user of the recording medium; a recording medium reading part for reading an identifier of the recording medium; a use status checking part for checking whether or not the recording medium is being used with proper authorization, based on the information on a use state extracted from the database, using the identifier read in the recording medium reading part as key information; a similarity determining part for calculating similarity by comparing the second biological information obtained in the user biological information obtaining part with the first biological information extracted from the database, using the identifier read in the recording medium reading part as key information, determining authorized use when the similarity exceeds a predetermined threshold value, and determining unauthorized use when the similarity is equal to or lower than a predetermined threshold value; and a recording medium writing part for writing, in a case of use with proper authorization, the information on a use status and, if required, the second biological information on the user in the database, and writing, in a case of use without proper authorization, invalidity information on the recording medium and the information on a use status in the database.

Because of the above-mentioned constitution, information for determining whether the recording medium is being used with proper authorization or without proper authorization is stored in a bunch in the recording medium, whereby it can be checked whether or not unauthorized use is conducted on each scene using the recording medium. Furthermore, the first biological information on an owner is updated every time the recording medium is used with proper authorization, so that misrecognition due to changes over time can be prevented.

Furthermore, the present invention is characterized by software for executing the functions of the above-mentioned user confirmation system as processing operations of a computer. More specifically, the method for confirming a user using a recording medium capable of storing information includes: obtaining first biological information on a user at a time of first use of the recording medium; registering the first biological information in the recording medium, considering the user as an owner of the recording medium; and detecting second biological information on the user at a time of second and later use of the recording medium, and determining whether or not the user using the recording medium is identical with the owner registered in the recording medium, based on the first and second biological information.

Because of the above-mentioned constitution, the program is loaded onto a computer for execution, whereby a user confirmation system can be realized, in which the biological information on a user is obtained at a time of use of the recording medium, so that identification between an owner and a user is rapidly confirmed, and unauthorized use, if any, is found.

Furthermore, the present invention is characterized by software for executing the functions of the above-mentioned user confirmation system as processing operations of a computer. More specifically, the method for confirming a user using a recording medium capable of storing information includes: obtaining first biological information on a user at a time of first use of the recording medium; registering the first biological information in a database disposed on a network, considering the user as an owner of the recording medium; and detecting second biological information on a user at a time of second and later use of the recording medium, and determining whether or not the user using the recording medium is identical with the owner registered in the database, based on the first and second biological information.

Because of the above-mentioned constitution, the program is loaded onto a computer for execution, whereby a user confirmation system can be realized, in which the biological information on a user is obtained at a time of use of the recording medium, so that identification between an owner and a user is rapidly confirmed, and unauthorized use, if any, is found, Furthermore, in this system, large-capacity data, such as biological information on users and owners, is stored on a network server, so that the use status of a user can be grasped merely by accessing the network server. This makes it possible to mange information as a single unit. Even in the case where a recording medium is damaged or lost, an owner's use status is obtained, and an exact fee can be collected by searching for use status data and/or biological information data on the network server.

These and other advantages of the present invention will become apparent to those skilled in the art upon reading and understanding the following detailed description with reference to the accompanying figures.

DESCRIPTION OF THE PREFERRED EMBODIMENTS

Embodiment 1

Figure 1:
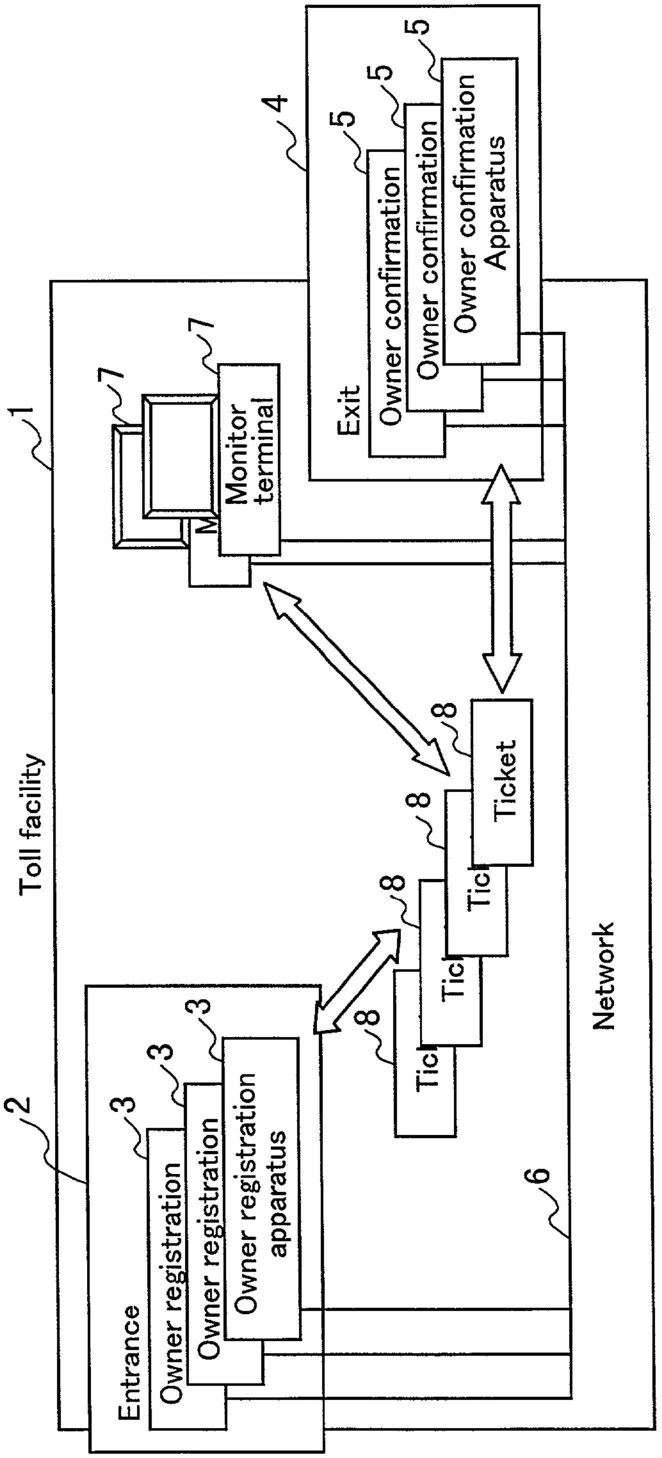
FIG. 1 is a block diagram of a user confirmation system of Embodiment 1 according to the present invention.

Hereinafter, a user confirmation system of Embodiment 1 according to the present invention will be described with reference to the drawings. FIG. 1 is a block diagram of the user confirmation system of Embodiment 1 according to the present invention. In Embodiment 1, a toll facility such as a railroad and an expressway is assumed in which a ticket is used at an entrance and an exit.

In FIG. 1, in the toll facility 1, a plurality of owner registration apparatuses 3 are disposed at an entrance 2, and a plurality of owner confirmation apparatuses 5 are disposed at an exit 4. The owner registration apparatuses 3 and the owner confirmation apparatuses 5 are respectively connected to monitor terminals 7 through a network 6.

When a user of the toll facility 1 inserts a ticket 8 into an insertion port or the like of the owner registration apparatus 3 at a time of entrance, his/her biological information (a face picture, a fingerprint, etc.) as an owner of the ticket 8 is recorded onto the ticket 8. Thus, when the user uses the ticket 8 for the first time, registration as an owner of the ticket 8 is conducted with respect to the ticket 8.

At a time of exit, in the owner confirmation apparatus 5, the biological information of a person who exits the facility is compared with the biological information of the owner recorded onto the ticket 8 at a time of entrance, whereby it is confirmed whether or not the registered owner of the ticket 8 is using the ticket 8.

In the case where unauthorized use (e.g., a person other than the registered owner is using the ticket 8) is determined, occurrence of unauthorized use and information on the unauthorized use are sent to the monitor terminal 7 through the network 6. Thus, the manager of the facility can find unauthorized use by a display on the monitor terminal 7.

Figure 2:
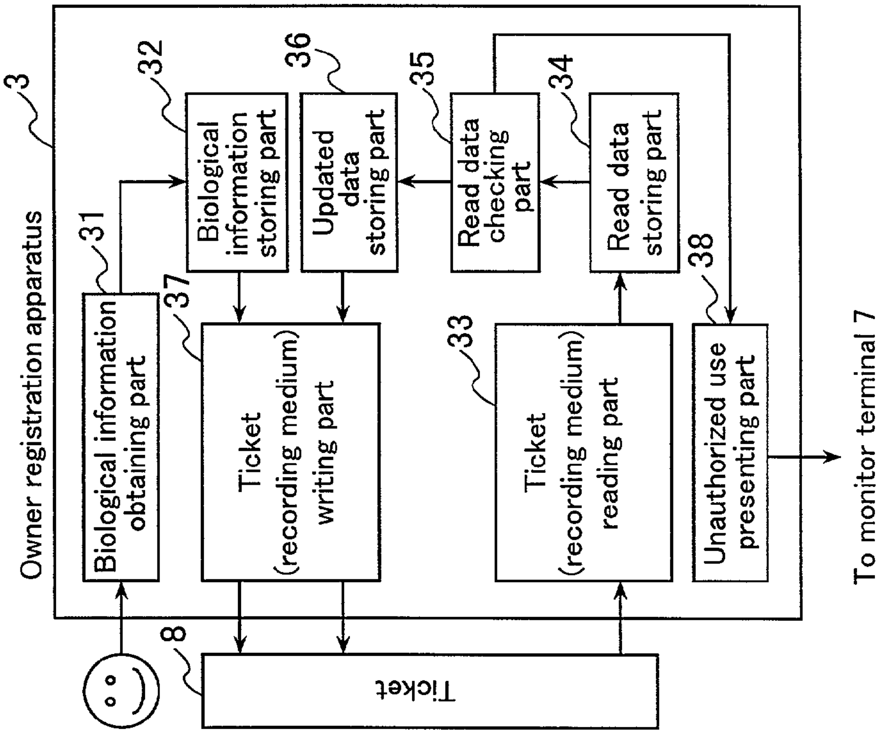
FIG. 2 is a block diagram of an owner automatic registration apparatus in the user confirmation system of Embodiment 1 according to the present invention.

FIG. 2 is a block diagram of an owner registration apparatus 3 in the user confirmation system of Embodiment 1 according to the present invention. In FIG. 2, reference numerals 31 and 32 denote a biological information obtaining part and a biological information storing part, respectively. In the biological information obtaining part 31, biological information peculiar to a user, such as a face picture, a fingerprint, a voiceprint, and an iris is obtained. In order to obtain biological information, for example, in the case of obtaining a face picture, a camera or the like is disposed in the biological information obtaining part 31, and in the case of utilizing a voiceprint, a microphone or the like is disposed in the biological information obtaining part 31.

Furthermore, in the case of adopting a face picture as biological information, a picture may be a still image or a moving image. In the case of a still image, it is desirable to prepare a plurality of images so as to enhance a recognition precision. Furthermore, in order to enhance a recognition precision, it is also effective to use a conventional technique of extracting only a face region. More specifically, portions similar in density to partial image models of eyes, a nose, and a mouth of a human are extracted from a user's picture, and a region where a relative positional relationship of these portions do not disagree to a configuration of a human's face is extracted as a face region. Furthermore, if a camera is disposed in the vicinity of the insertion port of the ticket 8, a user sees the insertion port every time he/she inserts the ticket 8 therein, so that this is effective for obtaining uniformity of a face picture to be obtained.

The biological information such as a face picture may be recorded as it is. In this case, a large storage capacity is generally required, so that it is also effective to extract feature values by a method in accordance with the kind of biological information and to record only the feature values.

Reference numerals 33 and 34 denote a ticket (recording medium) reading part and a read data storing part, respectively. The ticket (recording medium) reading part 33 reads the use status data and the like stored in the ticket 8.

Examples of the use status data include available date and time representing a period during which a ticket can be used, use conditions such as an available facility, owner registration information on whether or not an owner has been registered, and ticket validity information on whether or not a ticket is valid.

Examples of the recording medium used as the ticket 8 include a magnetic card and an IC card. Reading/writing with respect to the ticket 8 may be conducted either by a contact-type method or a non-contact type method. In the case of the contact-type method, for example, as in an automatic ticket gate at a railroad station, reading/writing is conducted with respect to the ticket 8 by inserting the ticket 8 into an insertion port. In the case of the non-contact type method, reading/writing is conducted with respect to the ticket 8 through a magnetic reader or the like.

The use status data and the like read by the ticket (recording medium) reading part 33 are stored in the read data storing part 34.

Furthermore, reference numerals 35 and 36 denote a read data checking part and an updated data storing part, respectively. The read data checking part 35 checks a use status of the ticket 8 from the use status data and the like stored in the read data storing part 34, and determines whether or not the ticket 8 is being used with proper authorization.

Examples of the conditions for authorized use include that a ticket ID is an unused ID, available date and time and an available facility are appropriate, an owner is unregistered, and a ticket is valid. In the case where these conditions are not satisfied, unauthorized use is determined.

In the case where authorized use is determined, an available facility and available date and time are added or updated, and an owner is registered, of which information is stored in the updated data storing part 36. In the case where unauthorized use is determined, an available facility and available date and time are added or updated, and a ticket is invalidated so as to inhibit the use of the ticket thereafter, of which information is stored in the updated data storing part 36.

Reference numerals 37 and 38 denote a ticket (recording medium) writing part and an unauthorized use presenting part, respectively. In the ticket (recording medium) writing part 37, the information stored in the updated data storing part 36 and the biological information storing part 32 are written in the ticket 8.

In the case of unauthorized use, in an unauthorized use presenting part 38, a user is notified of the unauthorized use while the monitor terminal 7 is notified of the occurrence of the unauthorized use. Unauthorized use is presented by various methods such as giving a warning sound, turning on a warning light, displaying unauthorized use information on a display, closing a gate, and warning with a synthetic voice.

Figure 3:
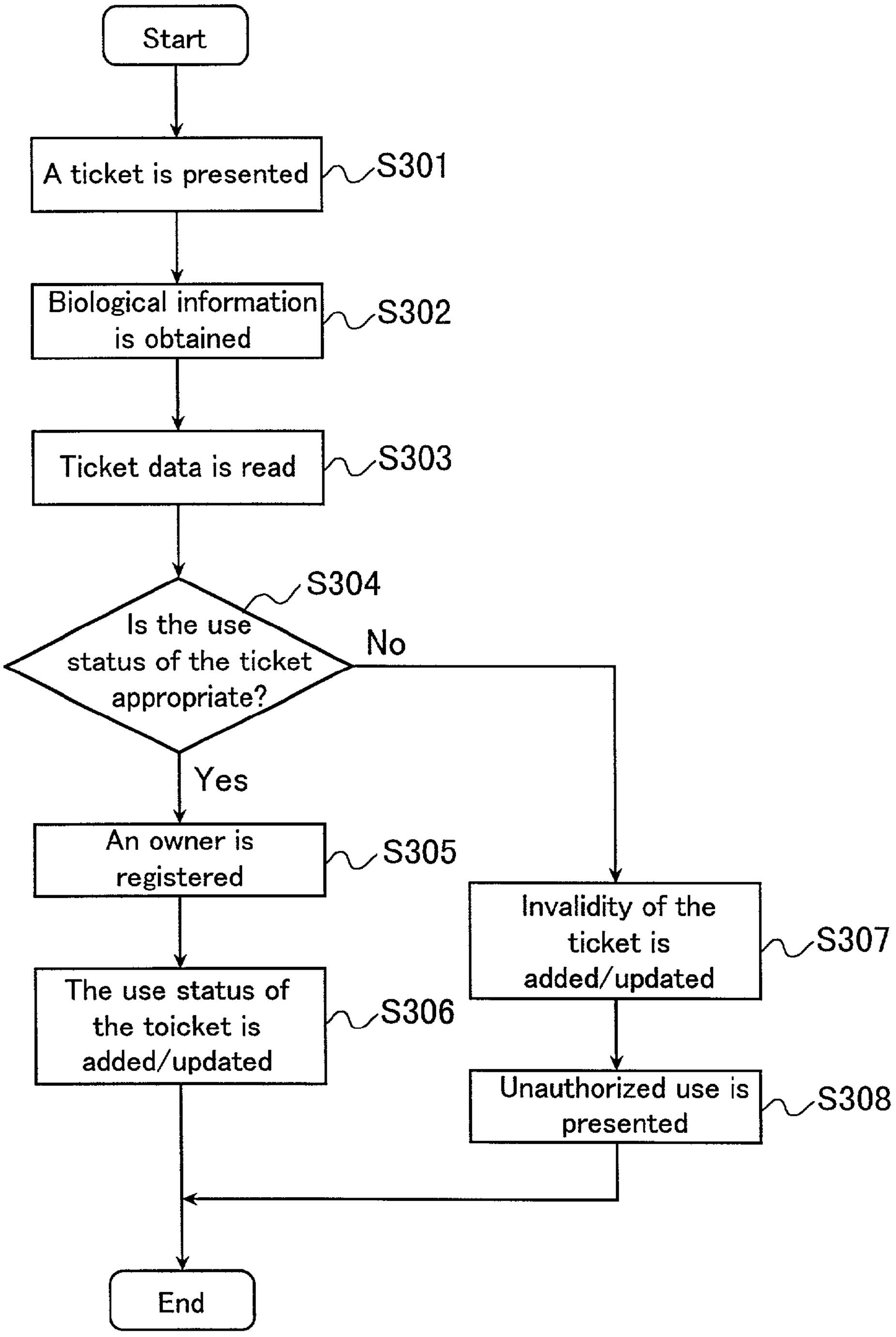
FIG. 3 is a flow chart illustrating processing of the owner automatic registration apparatus in the user confirmation system of Embodiment 1 according to the present invention.

FIG. 3 is a flow chart illustrating processing in the owner registration apparatus 3 in the user confirmation system of Embodiment 1 according to the present invention. In FIG. 3, a user first presents a ticket when entering a toll facility (Operation 301). If the ticket is a contact-type recording medium, the ticket is inserted into an insertion port dedicated to reading tickets, and in the case of a non-contact type recording medium, the ticket is brought into close to a ticket reading part. Simultaneously with presentation of the ticket, the biological information of a user using the ticket is obtained (Operation 302). Examples of the biological information to be obtained include a face picture, a fingerprint, and a voiceprint.

Next, ticket data stored in the ticket such as a ticket use status is read (Operation 303), and it is determined whether or not the use status of the ticket is appropriate (Operation 304).

In the case where it is determined that the use status of the ticket is appropriate (Operation 304: Yes), the biological information of a user is registered in the ticket so as to register the actual ticket user as the owner of the ticket (Operation 305). Then, the use status of the ticket is added/updated (Operation 306).

In the case where it is determined that the use status of the ticket is not appropriate (Operation 304: No), the use status of the ticket is added/updated together with the fact that unauthorized use has been conducted, and invalidity of the ticket is also updated and registered (Operation 307). Then, the user is notified of the unauthorized use while the unauthorized use is displayed on the monitor terminal through the network (Operation 308).

Figure 4:
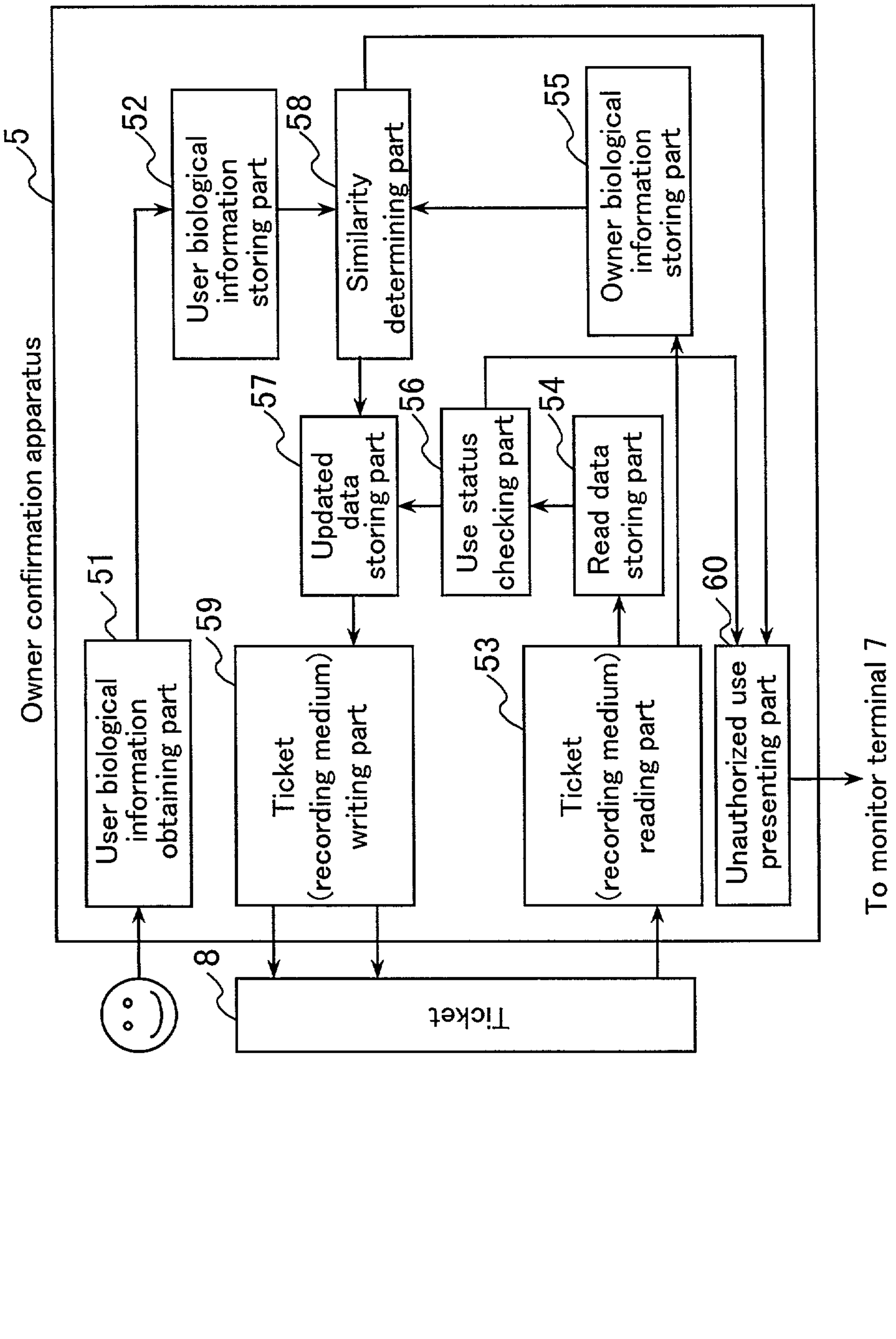
FIG. 4 is a block diagram of an owner automatic confirmation apparatus in the user confirmation system of Embodiment 1 according to the present invention.

FIG. 4 is a block diagram of an owner confirmation apparatus 5 in the user confirmation system of Embodiment 1 according to the present invention. In FIG. 4, reference numerals 51 and 52 denote a user biological information obtaining part and a user biological information storing part, respectively. In the user biological information obtaining part 51, the biological information peculiar to a user, such as a face picture, a fingerprint, a voiceprint, and an iris of an actual user, is obtained. In order to obtain biological information, for example, in the case of obtaining a face picture, a camera or the like is disposed in the user biological information obtaining part 51, and in the case of utilizing a voiceprint, a microphone or the like is disposed in the user biological information obtaining part 51.

Furthermore, in the case of adopting a face picture as biological information, a picture may be a still image or a moving image. In the case of a still image, it is desirable to prepare a plurality of images so as to enhance a recognition precision. Furthermore, in order to enhance a recognition precision, it is also effective to use a conventional technique of extracting only a face region. More specifically, portions similar in density to partial image models of eyes, a nose, and a mouth of a human are extracted from a user's picture, and a region where a relative positional relationship of these portions do not disagree to a configuration of a human's face is extracted as a face region.

Reference numerals 53, 54, and 55 denote a ticket (recording medium) reading part, a read data storing part, and an owner biological information storing part, respectively. The ticket (recording medium) reading part 53 reads use status data stored in the ticket 8 and the biological information of the owner of the ticket 8.

Examples of the use status data include a ticket ID peculiar to a ticket, available date and time representing a period during which a ticket can be used, use conditions such as an available facility, owner registration information on whether or not an owner has been registered, and ticket validity information on whether or not a ticket is valid.

The use status data read by the ticket (recording medium) reading part 53 is stored in the read data storing part 54, and the biological information peculiar to the owner is stored in the owner biological information storing part 55.

Furthermore, reference numerals 56, 57, and 58 denote a use status checking part, an updated data storing part, and a similarity determining part, respectively. The use status checking part 56 checks a use status of the ticket 8 from the use status data stored in the read data storing part 54, and determines whether or not the ticket 8 is being used with proper authorization.

Examples of the conditions for authorized use include that available date and time and an available facility are appropriate and a ticket is valid. In the case where these conditions are not satisfied, unauthorized use is determined.

In the case where authorized use is determined, an available facility and available date and time are added or updated, of which information is stored in the updated data storing part 57. In the case where unauthorized use is determined, an available facility and available date and time are added or updated, and a ticket is invalidated so as to inhibit the use of the ticket thereafter, of which information is stored in the updated data storing part 57.

In order to check whether or not the user using the ticket is identical with the registered owner of the ticket, the similarity determining part 58 calculates the similarity between the biological information of the ticket user stored in the user biological information storing part 52 and the biological information of the ticket owner stored in the owner biological information storing part 55.

For example, in the case of adopting a face picture as biological information, as the brightness values of face parts such as eyes, a nose, and a mouth are closer between face pictures to be compared, the similarity therebetween is calculated to be higher, and as the relative positional relationship of each face part is closer between the face pictures, the similarity therebetween is calculated to be higher. Furthermore, in the case of adopting a voiceprint as biological information, the similarity is calculated based on a matching degree of voiceprint patterns.

In the case where the similarity thus calculated exceeds a predetermined threshold value, the biological information of the ticket owner is considered to be identical with that of the ticket user, and it is determined that the ticket is being used with proper authorization. On the other hand, when the similarity is equal to or lower than a predetermined threshold value, the ticket owner is considered to be different from the ticket user, and it is determined that the ticket is not being used with proper authorization.

In the case where it is determined that the ticket is not being used with proper authorization, in order to prevent re-use of the ticket in advance, ticket invalidity information is stored in the updated data storing part 57.

Reference numerals 59 and 60 denote a ticket (recording medium) writing part and an unauthorized use presenting part, respectively. In the ticket (recording medium) writing part 59, the information stored in the updated data storing part 57 is written in the ticket 8.

In the case where unauthorized use is determined, in the unauthorized use presenting part 60, a user is notified of the unauthorized use while the monitor terminal 7 is notified of the occurrence of the unauthorized use. Unauthorized use is presented by various methods such as giving a warning sound, turning on a warning light, displaying unauthorized use information on a display, closing a gate, and warning with a synthetic voice.

Figure 5:
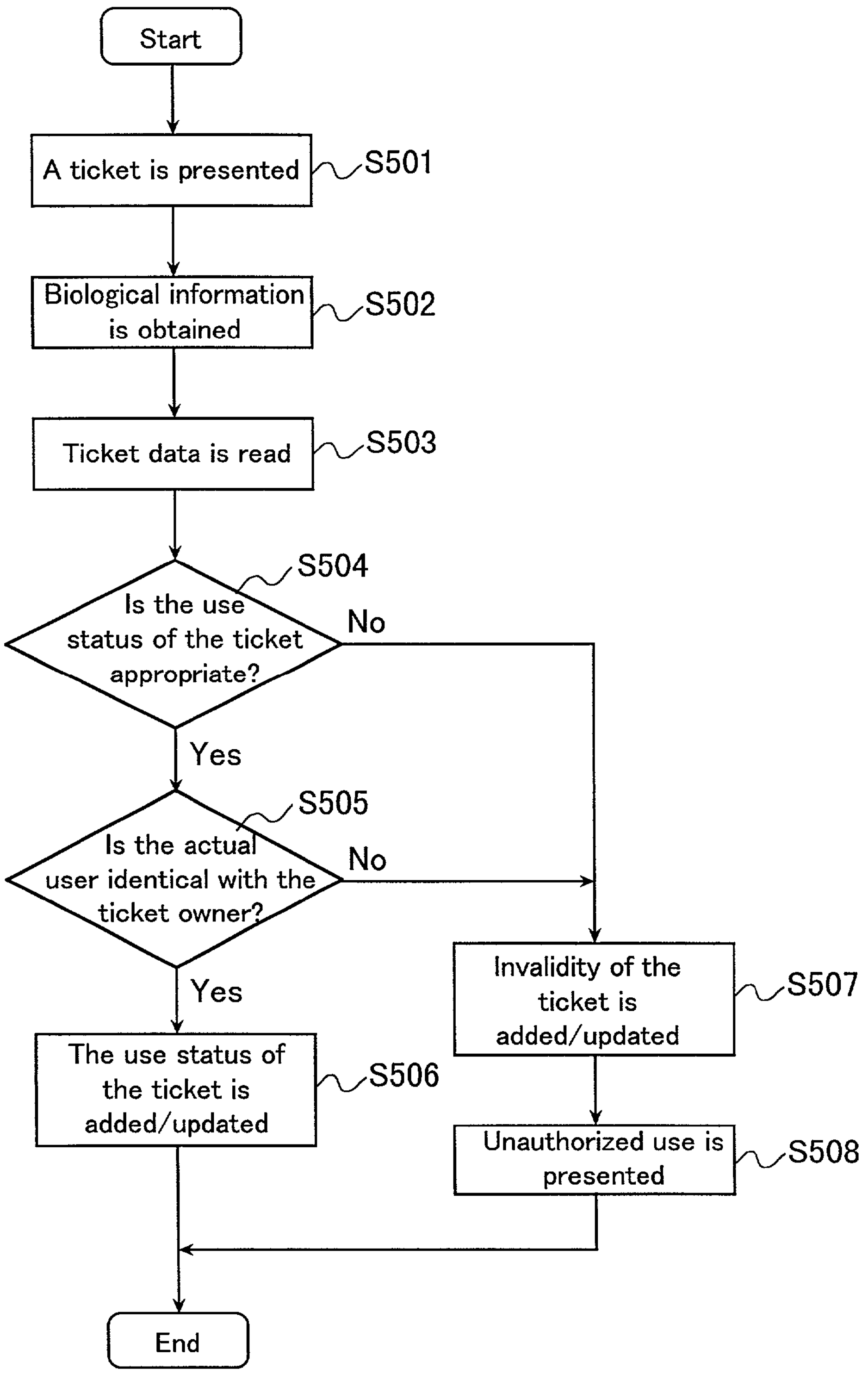
FIG. 5 is a flow chart illustrating processing of the owner automatic confirmation apparatus in the user confirmation system of Embodiment 1 according to the present invention.

FIG. 5 is a flow chart illustrating processing in an owner automatic confirmation apparatus 5 in the user confirmation system of Embodiment 1 according to the present invention. In FIG. 5, a user first presents a ticket when exiting from a toll facility (Operation 501). If the ticket is a contact-type recording medium, the ticket is inserted into an insertion port dedicated to reading tickets, and in the case of a non-contact type recording medium, the ticket is brought into close to a ticket reading part. Simultaneously with presentation of the ticket, the biological information of a user using the ticket is obtained (Operation 502). Examples of the biological information to be obtained include a face picture, a fingerprint, and a voiceprint.

Next, the ticket use status and the biological information of the ticket owner are read as ticket data (Operation 503), and it is determined whether or not the use status of the ticket is appropriate (Operation 504).

In the case where it is determined that the use status of the ticket is appropriate (Operation 504: Yes), the biological information of an actual user is compared with that of the ticket owner, whereby it is confirmed whether or not the actual user is identical with the ticket owner (Operation 505).

In the case where it is determined that the actual user is identical with the ticket owner by comparing the biological information of the actual user with that of the ticker owner (Operation 505: Yes), the ticket is considered to be used with proper authorization, and the use status of the ticket is added/updated (Operation 506).

In the case where it is determined that the ticket is being used without proper authorization (Operation 504: No), and it is determined that the actual user is not identical with the ticket owner (Operation 505: No), the use status of the ticket is added/updated together with the fact that the unauthorized use has been conducted, and ticket invalidity is also updated and registered (Operation 507). Then, the user is notified of the unauthorized use while the monitor terminal is notified of the unauthorized use through the network (Operation 508).

Furthermore, the monitor terminal 7 has functions of correcting misrecognition by the owner confirmation apparatus 5, as well as displaying the unauthorized use of the ticket 8 by the user. Because of this, the user can be protected from inconvenience that the ticket 8 is invalidated although the ticket 8 is being used with proper authorization.

More specifically, when the information on the unauthorized use is sent from the owner confirmation apparatus 5, invalidity information is written in the ticket 8. Then, it is required for the user, who feels certain that the determination has been caused by misrecognition by the owner confirmation apparatus 5, to bring the ticket 8 to a monitoring place where a supervisor is present, and ask the supervisor to conduct determination at the monitor terminal 7.

Therefore, the monitor terminal 7 is required to have functions similar to those of the owner registration apparatus 3 and the owner confirmation apparatus 5. More specifically, the information on the owner registered in the ticket 8 is compared with that on the user obtained at the monitor terminal 7, whereby it is confirmed whether or not the ticket owner is identical with the ticket user through the comparison in biological information and visual confirmation by the supervisor. In the case where identity is not determined even through visual confirmation by a third party, the ticket is considered to be used without proper authorization and remains invalid, and in the case where identity is determined and misrecognition by the owner confirmation apparatus 5 is determined, the ticket is considered to be valid and updated again.

As described above, according to Embodiment 1, the biological information on a user can be obtained at a time of use of a ticket. Therefore, the identification between the ticket owner and the ticket user can be rapidly confirmed, and unauthorized use, if any, can be found. Furthermore, natural suppression effects with respect to unauthorized use can be expected.

Embodiment 2

Figure 6:
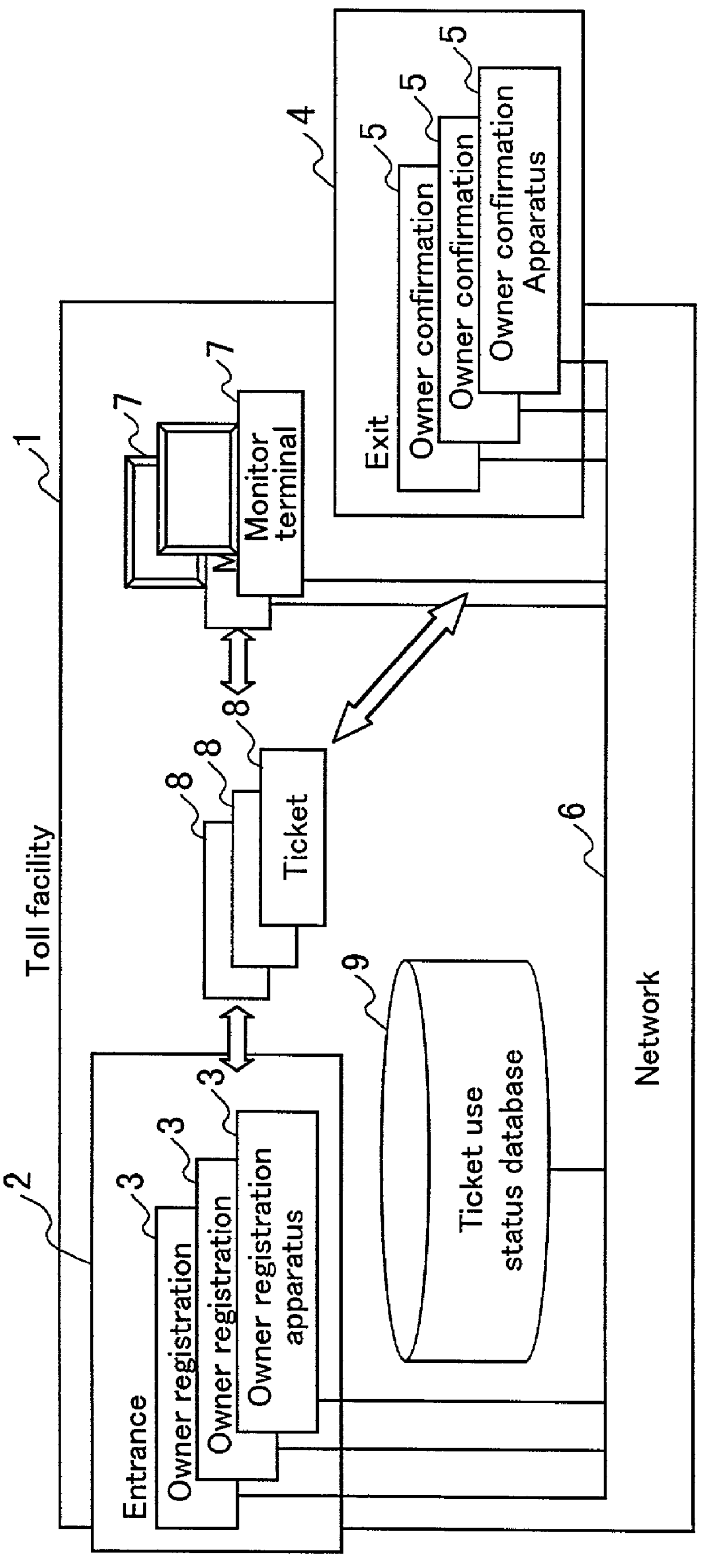
FIG. 6 is a block diagram of a user confirmation system of Embodiment 2 according to the present invention.

Next, a user confirmation system of Embodiment 2 according to the present invention will be described with reference to the drawings. FIG. 6 is a block diagram of the user confirmation system of Embodiment 2 according to the present invention. In Embodiment 2, a toll facility such as a railroad is assumed in the same way as in Embodiment 1.

The basic constitution of the user confirmation system in FIG. 6 is the same as that shown in FIG. 1, except that a ticket use status database 9 is disposed on a network 6.

The purpose of disposing the ticket use status database 9 on the network 6 is to manage, as a single unit, ticket use statuses and the like (which are stored in the ticket 8 in Embodiment 1) by a database on a network. According to this constitution, large-capacity data, such as biological information on users and owners, is stored on a network server, so that the use status of a user can be grasped merely by accessing the network server. This makes it possible to manage information in a bunch. Even in the case where a recording medium is damaged or lost, an owner's use status is obtained, and an exact fee can be collected by searching for use status data and/or biological information data on the network server.

Figure 7:
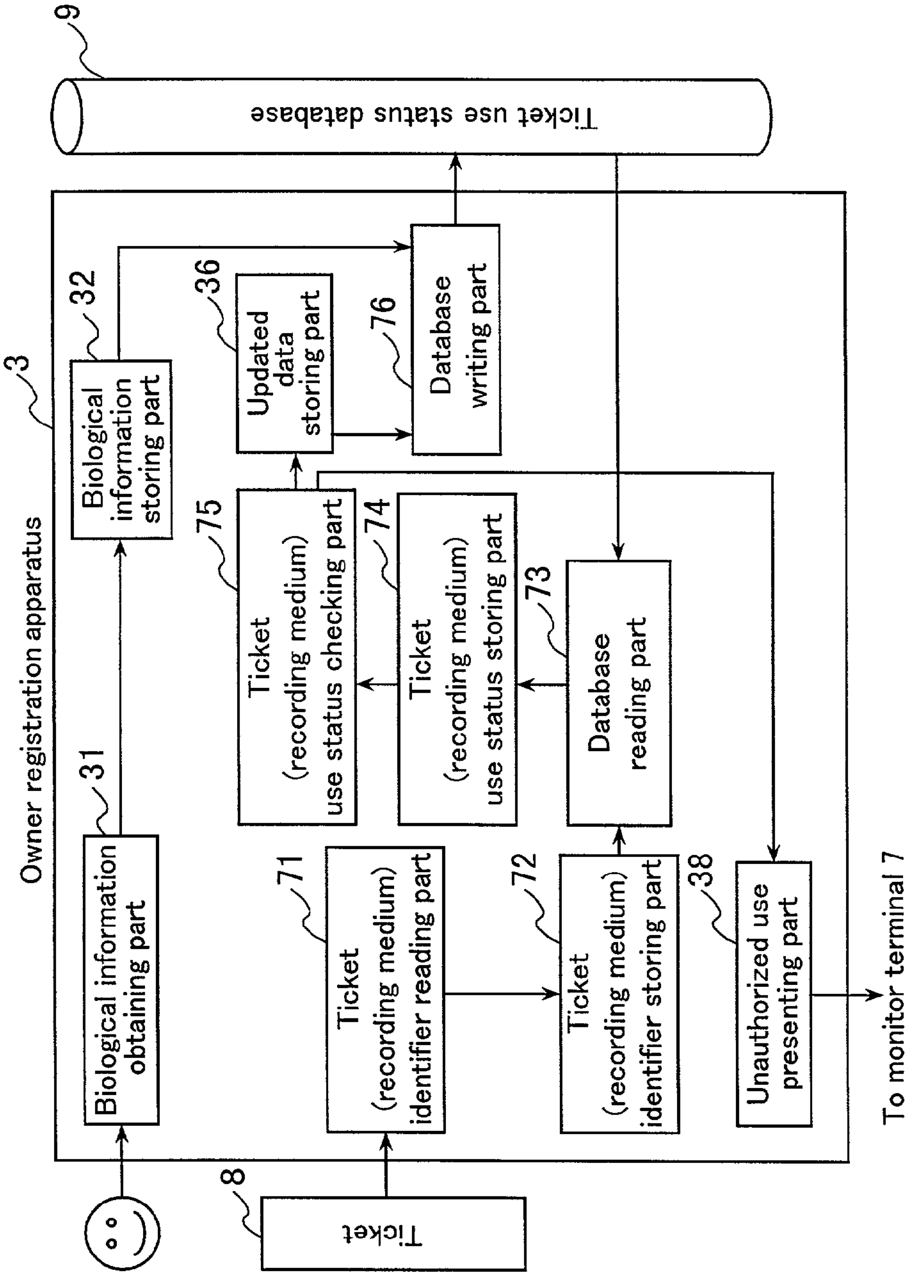
FIG. 7 is a block diagram of an owner automatic registration apparatus in the user confirmation system of Embodiment 2 according to the present invention.

Furthermore, due to the presence of the ticket use status database 9, the functions of the owner registration apparatus 3 and the owner confirmation apparatus 5 are slightly varied. FIG. 7 is a block diagram of the owner registration apparatus 3 in the user confirmation system of Embodiment 2 according to the present invention. In FIG. 7, reference numerals 31 and 32 denote a biological information obtaining part and a biological information storing part, respectively. In the biological information obtaining part 31, biological information peculiar to a user, such as a face picture, a fingerprint, a voiceprint, and an iris is obtained. In order to obtain biological information, for example, in the case of obtaining a face picture, a camera or the like is disposed in the biological information obtaining part 31, and in the case of utilizing a voiceprint, a microphone or the like is disposed in the biological information obtaining part 31.

Next, reference numerals 71 and 72 denote a ticket (recording medium) identifier reading part and a ticket (recording medium) identifier storing part, respectively. The ticket (recording medium) identifier reading part 71 reads a ticket ID or the like that is an identifier peculiar to a ticket stored in the ticket 8. The read ticket ID or the like is stored in the ticket (recording medium) identifier storing part 72.

Furthermore, reference numerals 73 and 74 denote a database reading part and a ticket (recording medium) use status storing part, respectively. The database reading part 73 is used for reading use status data and the like stored in the ticket use status database 9 on a ticket ID basis.

As the use of status data, available date and time representing a period during which a ticket can be used, use conditions such as an available facility, owner registration information on whether or not an owner has been registered, ticket validity information on whether or not a ticket is valid, and the like are stored on the basis of a ticket ID peculiar to a ticket.

The use status data and the like read by the database reading part 73 are stored in the ticket (recording medium) use status storing part 74.

Furthermore, reference numerals 75 and 36 denote a ticket (recording medium) use status checking part and an updated data storing part, respectively. In the ticket (recording medium) use status checking part 75, a use status of the ticket 8 is checked based on the use status data and the like stored in the ticket (recording medium) use status storing part 74, and it is determined whether or not the ticket 8 is being used with proper authorization.

In the case where authorized use is determined, an available facility and available date and time are added or updated, and an owner is registered, of which information is stored in the updated data storing part 36. In the case where unauthorized use is determined, an available facility and available date and time are added or updated, and a ticket is invalidated so as to inhibit the use of the ticket thereafter, of which information is stored in the updated data storing part 36.

Reference numerals 76 and 38 denote a database writing part and an unauthorized use presenting part, respectively. In the database writing part 76, the information stored in the updated data storing part 36 and the biological information storing part 32 are written in the ticket use status database 9.

In the case of unauthorized use, in an unauthorized use presenting part 38, a user is notified of the unauthorized use while a monitor terminal 7 is notified of the occurrence of the unauthorized use. Unauthorized use is presented by various methods such as giving a warning sound, turning on a warning light, displaying unauthorized use information on a display, closing a gate, and warning with a synthetic voice.

Figure 8:
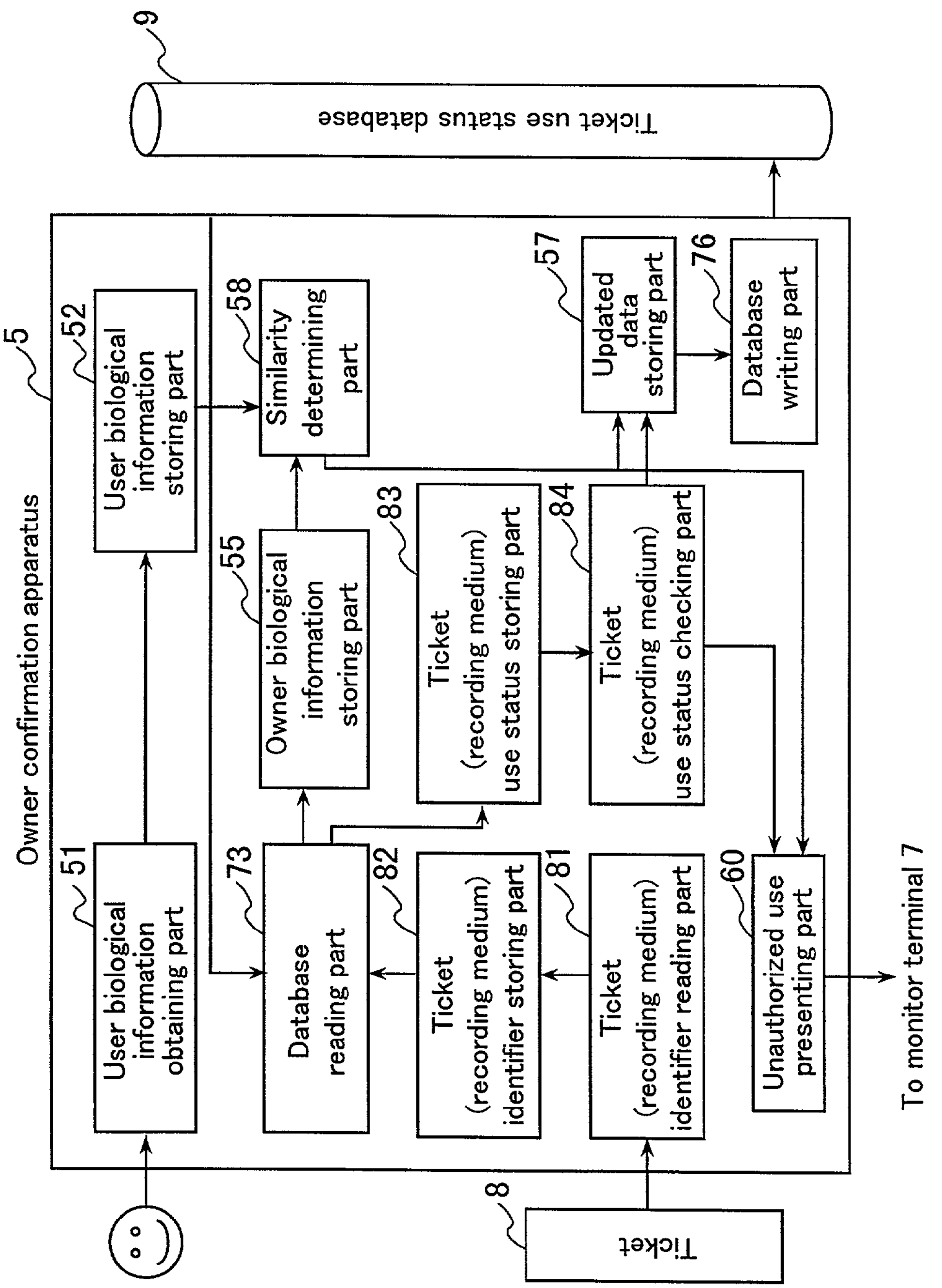
FIG. 8 is a block diagram of an owner automatic confirmation apparatus in the user confirmation system of Embodiment 2 according to the present invention.

FIG. 8 is a block diagram of the owner confirmation apparatus 5 in the user confirmation system of Embodiment 2 according to the present invention. In FIG. 8, reference numerals 51 and 52 denote a user biological information obtaining part and a user biological information storing part, respectively. In the user biological information obtaining part 51, biological information peculiar to a user, such as a face picture, a fingerprint, a voiceprint, and an iris of an actual user is obtained. In order to obtain biological information, for example, in the case of obtaining a face picture, a camera or the like is disposed in the user biological information obtaining part 51, and in the case of utilizing a voiceprint, a microphone or the like is disposed in the user biological information obtaining part 51.

Next, reference numerals 81 and 82 denote a ticket (recording medium) identifier reading part and a ticket (recording medium) identifier storing part, respectively. The ticket (recording medium) identifier reading part 81 reads a ticket ID or the like that is an identifier peculiar to a ticket stored in the ticket 8. The read ticket ID or the like is stored in the ticket (recording medium) identifier storing part 82.

Furthermore, reference numerals 73, 83 and 55 denote a database reading part, a ticket (recording medium) use status storing part, and an owner biological information storing part, respectively. The database reading part 73 is used for reading use status data stored in the ticket use status database 9 and biological information on an owner of the ticket 8.

As the use status data, available date and time representing a period during which a ticket can be used, use conditions such as an available facility, owner registration information on whether or not an owner has been registered, ticket validity information on whether or not a ticket is valid, and the like are stored on the basis of a ticket ID peculiar to a ticket.

The use status data read by the database reading part 73 is stored in the ticket (recording medium) use status storing part 83, and the biological information peculiar to an owner is stored in the owner biological information storing part 55, respectively.

Furthermore, reference numerals 84, 57, and 58 denote a ticket (recording medium) use status checking part, an updated data storing part, and a similarity determining part, respectively. In the ticket (recording medium) use status checking part 84, a use status of the ticket 8 is checked based on the use status data stored in the ticket (recording medium) use status storing part 83, and it is determined whether or not the ticket 8 is being used with proper authorization.

Examples of the conditions for authorized use include that available date and time and an available facility are appropriate, and a ticket is valid. In the case where these conditions are not satisfied, unauthorized use is determined.

In the case where authorized use is determined, an available facility and available date and time are added or updated, of which information is stored in the updated data storing part 57. In the case where unauthorized use is determined, an available facility and available date and time are added or updated, and a ticket is invalidated so as to inhibit the use of the ticket thereafter, of which information is stored in the updated data storing part 57.

In order to check whether or not the user using the ticket is identical with the registered owner of the ticket, the similarity determining part 58 calculates the similarity between the biological information of the ticket user stored in the user biological information storing part 52 and the biological information of the ticket owner stored in the owner biological information storing part 55.

In the case where the similarity calculated in the same way as in Embodiment 1 exceeds a predetermined threshold value, the biological information of the ticket owner is considered to be identical with that of the ticket user, and it is determined that the ticket is being used with proper authorization. On the other hand, when the similarity is equal to or lower than a predetermined threshold value, the ticket owner is considered to be different from the ticket user, and it is determined that the ticket is not being used with proper authorization.

In the case where it is determined that the ticket is not being used with proper authorization, in order to prevent re-use of the ticket in advance, ticket invalidity information is stored in the updated data storing part 57.

Reference numerals 76 and 60 denote a database writing part and an unauthorized use presenting part, respectively. In the database writing part 76, the information stored in the updated data storing part 57 is written in the ticket use status database 9.

In the case where unauthorized use is determined, in the unauthorized use presenting part 60, a user is notified of the unauthorized use while the monitor terminal 7 is notified of the occurrence of the unauthorized use. Unauthorized use is presented by various methods such as giving a warning sound, turning on a warning light, displaying unauthorized use information on a display, closing a gate, and warning with a synthetic voice.

Figure 9:
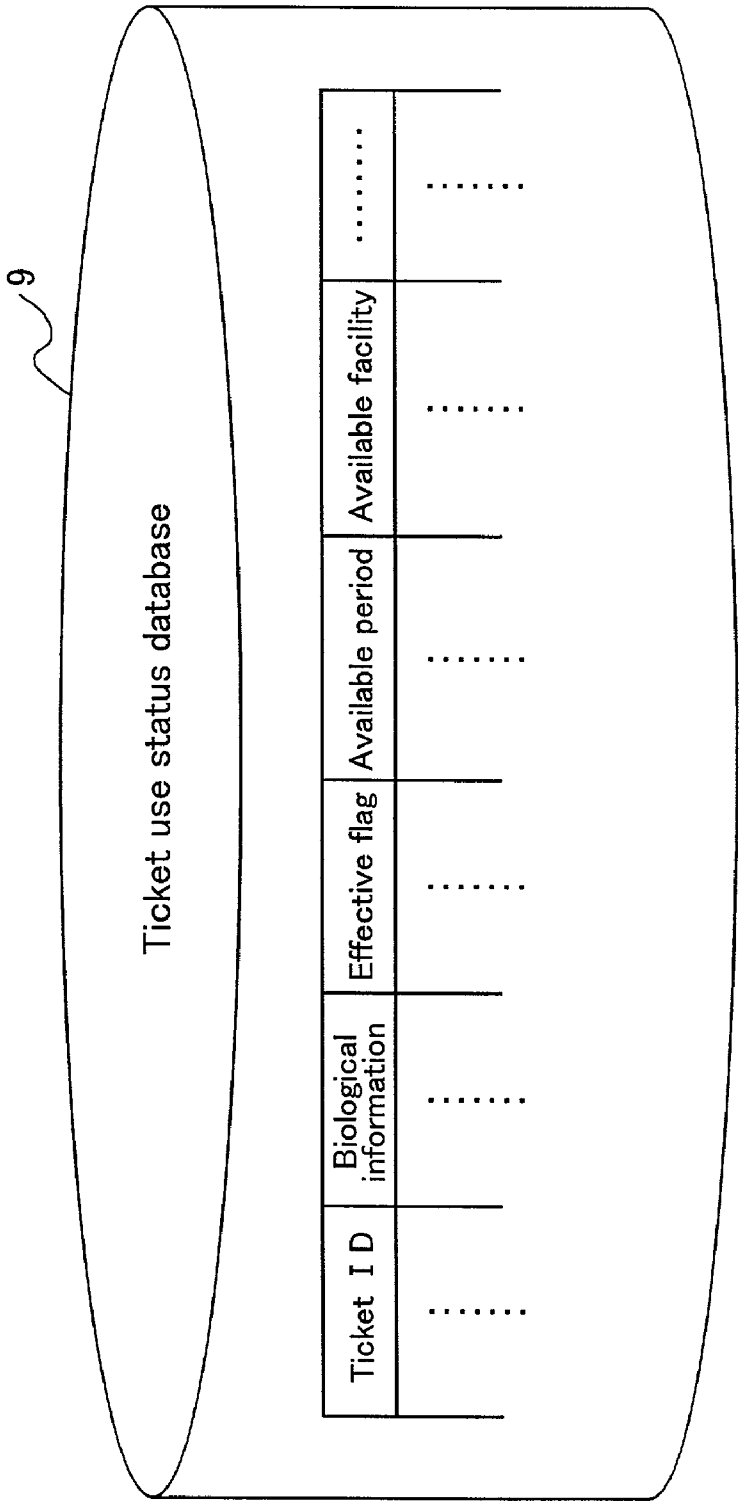
FIG. 9 illustrates a configuration of a ticket use status database in the user confirmation system of Embodiment 2 according to the present invention.

In the use status database 9, validity/invalidity flag of a ticket, an available period, an available facility, and the like, as well as the biological information of a ticket owner are stored as one record, using a ticket ID as key information. For example, a database configuration as shown in FIG. 9 is considered. Information to be stored is not particularly limited to those described above.

As described above, according to Embodiment 2, in the same way as in Embodiment 1, the biological information on a user is obtained at a time of use of a ticket. Therefore, identification between a ticket owner and a ticket user can be rapidly confirmed, and unauthorized use, if any, can be found. Furthermore, large-volume of data such as the biological information on a user and biological information on a ticket owner can be stored on the network server, so that the use status of a user can be grasped merely by accessing the network server, and information can be managed in a single unit. Furthermore, even in the case where a recording medium is damaged or lost, an owner's use status is obtained, and an exact fee can be collected by searching for use status data and/or biological information data on the network server.

Figure 10:
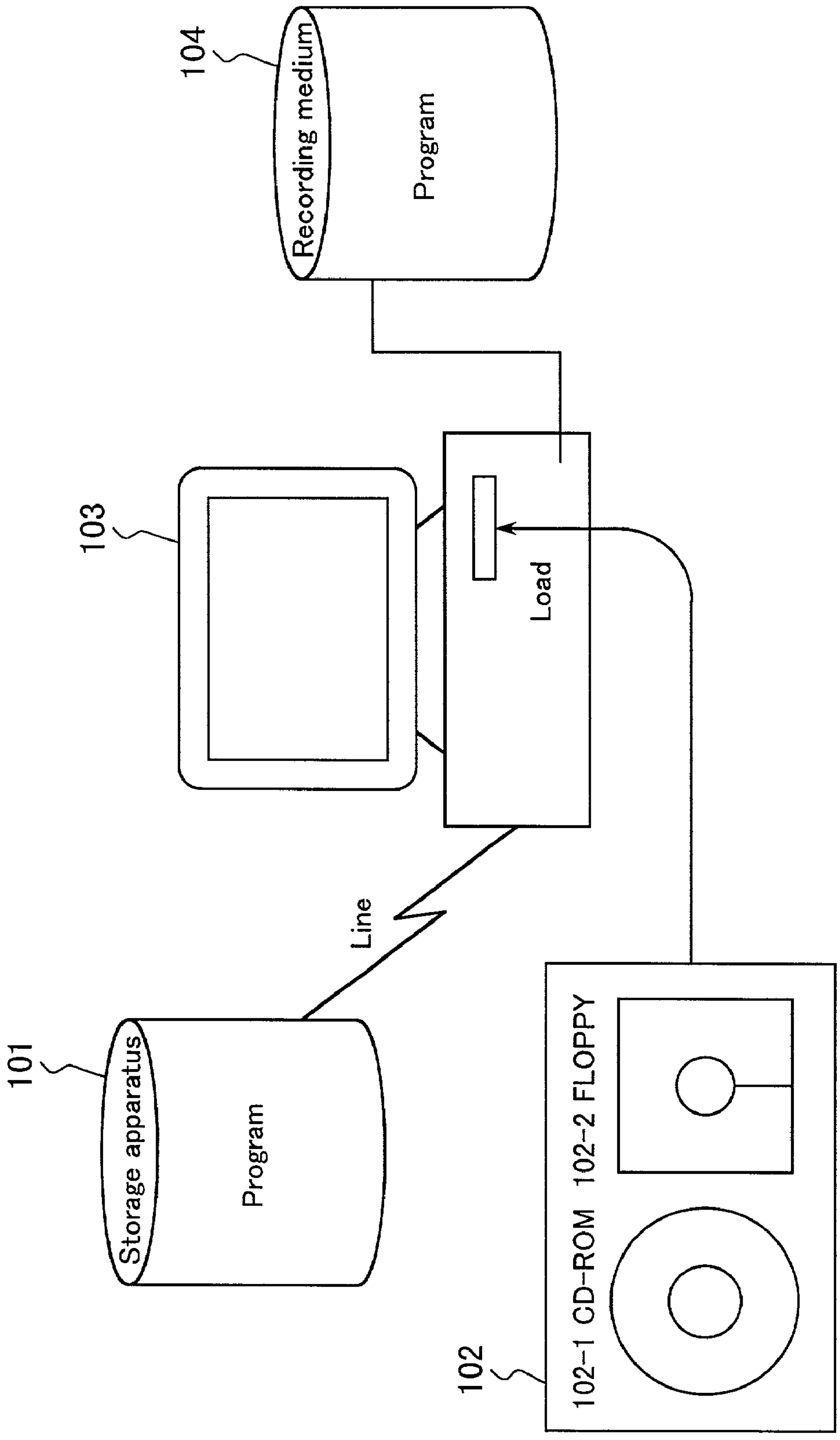
FIG. 10 shows exemplary recording media.

Examples of a recording medium storing a program for realizing the user confirmation system of the embodiments according to the present invention include a storage apparatus 101 provided at the end of a communication line, and a recording medium 104 such as a hard disk and a RAM of a computer 103, as well as a portable recording medium 102 such as a CD-ROM 102-1 and a floppy disk 102-2, as shown in FIG. 10. In execution, the program is loaded onto a computer, and executed on a main memory.

Furthermore, examples of a recording medium storing a ticket use status database and the like generated by the user confirmation system of the embodiments according to the present invention also include a storage apparatus 101 provided at the end of a communication line, and a recording medium 104 such as a hard disk and a RAM of a computer 103, as well as a portable recording medium 102 such as a CD-ROM 102-1 and a floppy disk 102-2, as shown in FIG. 10. For example, when the user confirmation system according to the present invention is utilized, such a recording medium is read by the computer 103.

As described above, according to the user confirmation system of the present invention, the biological information on a user is obtained at a time of use of a ticket. Therefore, identification between a ticket owner and a ticket user can be rapidly confirmed, and unauthorized use, if any, can be found.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A confirmation system for confirming, in a facility that can be used by presenting a recording medium capable of recording information, whether or not the facility is being used with authorization, comprising:

an owner registration apparatus placed in the facility and an owner confirmation apparatus placed in the facility, the recording medium being capable of recording information on a use status of the recording medium in the facility, wherein the owner registration apparatus comprises:

a recording medium reading part for reading information recorded on the recording medium, a first biological information obtaining part for checking the use status of the recording medium in the facility from the information read by the recording medium reading part, determining that the recording medium is presented for a first time in the facility, and obtaining first biological information from an owner of the recording medium, and a biological information storing part for storing the obtained first biological information in the recording medium; and the owner confirmation apparatus comprises:

a recording medium reading part for reading the information recorded on the recording medium;

a second biological information obtaining part for checking the use status of the recording medium in the facility from the information read from the recording medium reading part, and obtaining second biological information from the owner of the recording medium, in a case where it is determined that the recording medium is presented at a second, later time in the facility; and a determining part for determining whether or not the owner at the time of the first presentation of the recording medium is the same as the owner at the second, later time of presentation of the recording medium by comparing the first biological information stored in the recording medium with the second biological information obtained by the second biological information obtaining part.

2. A confirmation system according to claim 1, wherein the owner registration apparatus further comprises:

a read data checking part for checking the use status of the recording medium in the facility from the information read by the recording medium reading part, and checking whether or not the recording medium is being used with proper authorization; and a recording medium writing part for writing, in a case of use with proper authorization, the information on the use status of the recording medium in the recording medium, and writing, in a case of use without proper authorization, invalidity information on the recording medium and the information on the use status in the recording medium.

3. A confirmation system according to claim 2, wherein the owner confirmation apparatus further comprises:

a use status checking part for checking the use status of the recording medium in the facility from the information read by the recording medium reading part, and checking whether or not the recording medium is being used with proper authorization; and a recording medium writing part for writing, in a case of use with proper authorization, the information on the use status, and writing, in a case of use without proper authorization, invalidity information on the recording medium and the information on the use status in the recording medium.

4. A confirmation system for confirming, in a facility that can be used by presenting a recording medium capable of recording information, whether or not the facility is being used with authorization, comprising:

an owner registration apparatus placed in the facility, an owner confirmation apparatus, and a database, accessible from the owner registration apparatus and the owner confirmation apparatus, for storing a use status of the recording medium in the facility so as to associate the use status with an identifier of the recording medium, wherein the owner registration apparatus comprises:

a recording medium reading part for reading the identifier of the recording medium from the recording medium;

a first biological information obtaining part for determining that the recording medium is presented for a first time in the facility based on the information on the use status extracted from the database, using the identifier read in the recording medium reading part as key information, and obtaining first biological information from an owner of the recording medium;

a biological information storing part for registering the first biological information in the database so as to associate the first biological information with the identifier;

the owner confirmation apparatus includes:

a recording medium reading part for reading the identifier of the recording medium from the recording medium;

a second biological information obtaining part for obtaining second biological information from the owner of the recording medium in a case where it is determined that the recording medium is presented at second and later time in the facility based on the information on the use status extracted from the database, using the identifier read in the recording medium reading part as key information; and a determining part for determining whether or not the owner at the time of the first presentation of the recording medium is the same as the owner at the second, later presentation of the recording medium by comparing the first biological information stored in the database, so as to be associated with the identifier, with the second biological information obtained in the second biological information obtaining part.

5. A confirmation system according to claim 4, wherein the owner registration apparatus further comprises:

a read data checking part for checking whether or not the recording medium is being used with proper authorization, based on the information on a use state extracted from the database, using the identifier read in the recording medium reading part as key information; and a recording medium writing part for writing, in a case of use with proper authorization, the information on a use status of the recording medium in the database and writing, in a case of use without proper authorization, invalidity information on the recording medium and the information on a use status in the database.

6. A confirmation system according to claim 5, wherein the owner confirmation apparatus further comprises:

a use status checking part for checking whether or not the recording medium is being used with proper authorization, based on the information on a use status extracted from the database, using the identifier read in the recording medium reading part as key information; and a recording medium writing part for writing, in a case of use with proper authorization, the information on a use status in the database, and writing, in a case of use without proper authorization, invalidity information on the recording medium and the information on a use status in the database.

7. A method for confirming, in a facility that can be used by presenting a recording medium capable of recording information, whether or not the facility is being used with authorization, comprising:

an owner registration apparatus and an owner confirmation apparatus are located in the facility;

the recording medium is capable of recording information on a use status of the recording medium in the facility, the owner registration reads information recorded on the recording medium, checks a use status of the recording medium in the facility from the read information, and determines whether the recording medium is presented for a first time in the facility, obtains first biological information from an owner of the recording medium and registers the first biological information in the recording medium;

the owner confirmation apparatus reads the information recorded on the recording medium, checks the use status of the recording medium in the facility from the read information, and in case where it is determined that the recording medium is presented at a second, later time in the facility obtains second biological information from the owner of the recording medium, and determines whether or not the owner at the time of first presentation of the recording medium is the same as the owner at the second, later time of presentation of the recording medium by comparing the registered first biological information with the obtained, second biological information.

8. A method for confirming, in a facility that can be used by presenting a recording medium capable of recording information, whether or not the facility is being used with authorization, wherein an owner registration apparatus and an owner confirmation apparatus are located in the facility and are capable of accessing a database for storing a use status of the recording medium in the facility so as to associate the use status with an identifier of the recording medium, comprising:

using the owner registration apparatus, reading the identifier of the recording medium from the recording medium, and determining whether the recording medium is presented for a first time in the facility, based on the information on the use status extracted from the database, using the identifier read from the recording medium as key information, and obtaining first biological information from an owner of the recording medium and storing the first biological information in the database so as to associate the first biological information with the identifier;

using the owner confirmation apparatus, reading the identifier of the recording medium from the recording medium, and in a case where it is determined that the recording medium is being presented a second, later time in the facility, based on information on the use status extracted from the database, using the identifier read from the recording medium as key information, obtaining second biological information from the owner of the recording medium, and determining whether or not the owner at the time of first presentation of the recording medium is the same as the owner at the second and later presentation of the recording medium by comparing the stored first biological information in, with the obtained, second biological information.

9. A computer-readable recording medium storing a program for controlling the computer to confirm, in a facility that can be used by presenting a recording medium capable of recording information, whether or not the facility is being used with authorization, and wherein an owner registration apparatus and an owner confirmation apparatus are located in the facility, and the recording medium is capable of recording information on a use status of the recording medium in the facility, by:

controlling the owner registration apparatus to read information recorded on the recording medium, to check the use status of the recording medium in the facility from the read information, and to determine whether the recording medium is presented for a first time in the facility, to obtain first biological information from an owner of the recording medium and to store the first biological information in the recording medium, controlling the owner confirmation apparatus to read information recorded on the recording medium, to check the status of the recording medium in the facility from the read information, and in a case where it is determined that the recording medium is presented for a second, later time in the facility, to obtain second biological information from the owner of the recording medium, and to determine whether or not the owner at the time of first presentation of the recording medium is the same as the owner at the second, later presentation of the recording medium by comparing the first biological information stored in the recording medium with the obtained second biological information.

10. A computer-readable recording medium storing a program for controlling the computer to confirm, in a facility that can be used by presenting a recording medium capable of recording information, whether or not the facility is being used with authorization, and wherein an owner registration apparatus and an owner confirmation apparatus are located in the facility, by:

controlling the owner registration apparatus and the owner confirmation apparatus to access a database for storing a use status of the recording medium in the facility so as to associate the use status with an identifier of the recording medium;

controlling the owner registration apparatus to read the identifier of the recording medium from the recording medium and determine whether the recording medium is presented for a first time in the facility, based on the information on the use status extracted from the database, using the identifier read from the recording medium as key information, to obtain first biological information from the owner of the recording medium and to register the first biological information in the database so as to associate the first biological information with the identifier;

controlling the owner confirmation apparatus to read the identifier of the recording medium from the recording medium and, in a case where it is determined that the recording medium is presented at a second, later time in the facility, based on information on the use status extracted from the database, using the identifier read from the recording medium as key information, to obtain second biological information from the owner of the recording medium, and to determine whether or not the owner at the time of first presentation of the recording medium is the same as the owner at the second, later presentation of the recording medium by comparing the first biological information stored in the database so as to be associated with the identifier with the obtained, second biological information.

* * * * *

UNITED STATES PATENT AND TRADEMARK OFFICE

CERTIFICATE OF CORRECTION

PATENT NO. : 7,076,664 B2
APPLICATION NO. : 09/808004
DATED : July 11, 2006
INVENTOR(S) : Kentaro Murase et al.

It is certified that error appears in the above-identified patent and that said Letters Patent is hereby corrected as shown below:

Column 16, Line 51, change “comprising:” to --wherein:--.

Column 16, Line 56, after “registration” change “reads” to --apparatus reads--.

Signed and Sealed this

Tenth Day of April, 2007

JON W. DUDAS
*Director of the United States Patent and Trademark Office*